United States Patent [19]

Kliman et al.

[11] Patent Number: 4,761,703
[45] Date of Patent: Aug. 2, 1988

[54] ROTOR FAULT DETECTOR FOR INDUCTION MOTORS

[75] Inventors: Gerald B. Kliman; Rudolph A. A. Koegl, both of Schenectady; Max W. Schulz, Jr., Scotia; Stephen E. Grabkowski, Schenectady, all of N.Y.

[73] Assignee: Electric Power Research Institute, Inc., Palo Alto, Calif.

[21] Appl. No.: 91,594

[22] Filed: Aug. 31, 1987

[51] Int. Cl.$^4$ .............................................. H02H 7/08
[52] U.S. Cl. ........................................ 361/23; 361/31; 361/78; 318/798; 318/806
[58] Field of Search ....................... 361/23, 24, 28, 30, 361/31, 78, 25, 76; 318/782, 798, 806

[56] References Cited

U.S. PATENT DOCUMENTS

| | | | |
|---|---|---|---|
| 4,434,390 | 2/1984 | Elms | 361/24 X |
| 4,451,112 | 5/1984 | Hattori et al. | 318/806 X |
| 4,467,260 | 8/1984 | Mallick, Jr. et al. | 361/24 X |
| 4,510,548 | 4/1985 | Boothman | 361/24 X |
| 4,623,830 | 11/1986 | Peneder et al. | 318/798 |
| 4,651,078 | 3/1987 | Todoroki et al. | 318/798 |

Primary Examiner—M. H. Paschall
Assistant Examiner—A. Jonathan Wysocki
Attorney, Agent, or Firm—Flehr, Hohbach, Test, Albritton & Herbert

[57] ABSTRACT

A method and apparatus for detecting rotor faults in an induction motor. A flux sensor generates a flux signal corresponding to the magnetic flux at a predefined flux detection point external to the motor. A current sensor generates a current signal proportional to the current drawn by said motor. A time series of data points is stored, representing the values of the flux signal and the current signal over a period of time. The time series are transformed by FFT into a set of flux spectra and into a set of current spectra. Then the line frequency of the motor's power supply is determined by finding the maximum of the current spectra. Similarly, the slip frequency of the motor is determined by finding the maximum of the flux spectra in a predefined spectral range (e.g., below 2 Hz). The analysis of the rotor is then performed by comparing the amplitude of the current spectra, at a set of rotor fault harmonic frequencies, with specified fault threshold criteria. Each rotor fault harmonic frequency is a predefined function of the line frequency and the slip frequency. The presence of a rotor fault is denoted if the amplitude of any of said current spectra exceed a corresponding fault threshold criteria.

22 Claims, 3 Drawing Sheets

ROTOR FAULT DETECTION FLOW CHART

4,761,703

ROTOR FAULT DETECTOR FOR INDUCTION MOTORS

The present invention relates generally to induction motors, and particularly to a system and method for detecting the presence of rotor bar faults in induction motors.

BACKGROUND OF THE INVENTION

The present invention monitors an induction motor while it is operational, and detects and locates rotor faults in real time without interfering with the operation of the motor.

In this specification, the term "rotor fault" means a break or partial break in any of the rotor bars, or in the end rings, of the rotor in an induction motor. Rotor faults, although not as common as bearing or insulation faults, can cause catastrophic destruction of an induction motor. Especially in large motors, rotor faults can be extremely dangerous.

The electric power industry, among others, has tried for many years to develop reliable methods of detecting rotor faults well before such faults result in destruction of the motor or damage to associated systems (e.g., caused by motor vibration). To the extent possible, the ideal rotor fault detector will be extremely reliable (i.e., it will find all faults, and will have a low false alarm rate), will not require interruption of the motor's operation, and will be inexpensive to build and operate.

The prior art includes numerous methods of detecting rotor faults, also known as "cage faults". Most require one or more of the following actions: disassembly of the motor, motor shut down, and/or special connection of instrumentation inside the motor. For instance, the growler method uses an electromagnet coupled to the rotor surface which emits a loud noise when it spans an open rotor bar. This requires disassembly of the motor.

"Single phase" testing requires disconnecting one phase of the motor's power supply, and monitoring the current drawn while exciting the remaining terminals at low voltage and rotating the rotor slowly, by hand. If there is a broken bar the current drawn will vary with rotor position. While sensitivity is good—a broken bar is usually clearly evidenced by a current variation of over five percent—the motor must be taken out of service and one phase disconnected. Further, the low voltage power requirement is considered to be a safety hazard by many utility companies.

The present invention detects rotor faults without interrupting motor operation, by analyzing two signals which are available external to the motor while the motor is running: the motor's line current and the axial flux signals external to the motor. Therefore motor shutdown is not required, not even to install a flux sensor. The underlying theory of operation is that certain "rotor fault harmonics" of the motor's line frequency (actually certain sidebands of $nf_o$, where n is an integer and $f_o$ is the fundamental line frequency of the motor's power source) will be markedly different for motors with normal rotors and for motors with at least one rotor fault. Another part of the theory of operation is that measurement of a motor's axial flux signal, at the motor's slip frequency, can determine the presence of an end ring break.

It is therefore a primary object of the present invention to provide a nonintrusive system and method for detecting rotor bar faults in induction motors.

Another object and feature of the present invention is autonomous operation. The invention is designed so that the user neither needs to understand its operation, nor needs to perform any functions which would require knowledge of data analysis, or even induction motors.

SUMMARY OF THE INVENTION

In summary, the present invention is a method and apparatus for detecting rotor faults in an induction motor. The current drawn by the motor and the motor's axial flux, as detected external to the motor, are analyzed. In particular, the axial flux signal is used to determine the slip frequency of the motor and to detect end ring breaks. Then a multiplicity of predefined rotor fault harmonics (actually predefined sidebands of the harmonics) of the power supply's fundamental frequency are compared against preset criteria to determine if any of the motor's rotor bars are broken or cracked.

The motor's current is detected by the use of a current transformer, and the axial flux is detected by a flux sensor (such as a simple circular coil) which is external to the motor and approximately aligned with the motor's rotor axis.

The current and flux signals are digitally processed by digitizing the signals, storing the signals in a computer's memory, performing a high resolution FFT to generate current and flux spectra, identifying the current's fundamental frequency and the slip frequency of the motor, and then comparing predefined ones of the flux and current spectra against preset criteria.

BRIEF DESCRIPTION OF THE DRAWINGS

Additional objects and features of the invention will be more readily apparent from the following detailed description and appended claims when taken in conjunction with the drawings, in which;

DESCRIPTION OF THE PREFERRED EMBODIMENT

Figure 1:
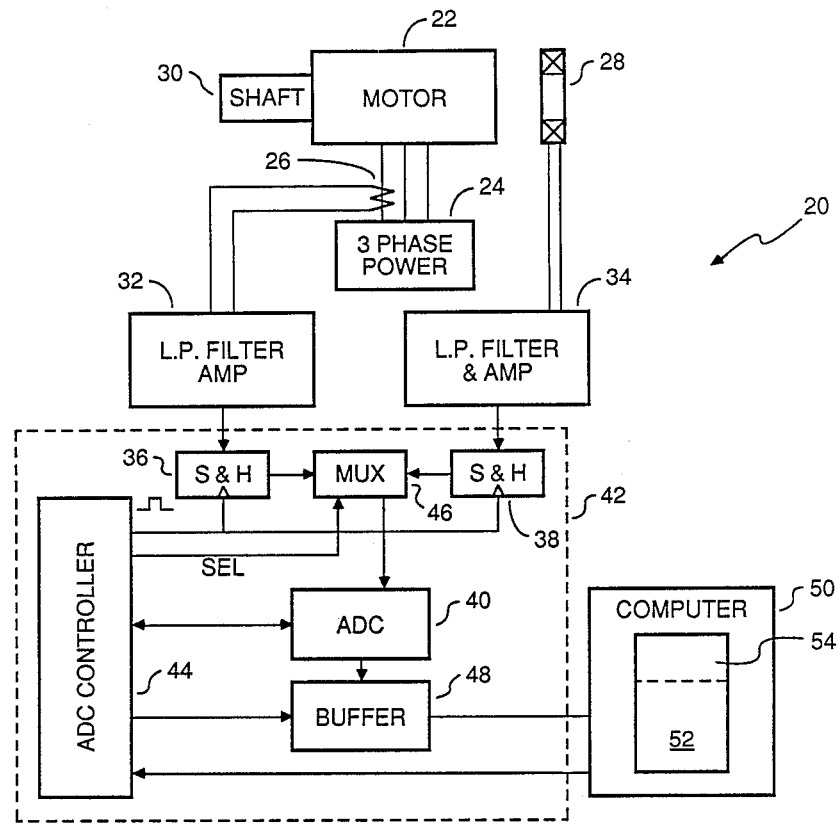
FIG. 1 is a block diagram of a rotor bar fault detection system in accordance with the present invention.

Referring to FIG. 1, there is shown a nonintrusive rotor bar fault detection system 20 for an induction motor 22. The motor 22 receives power from a standard three phase power source 24. In the preferred embodiment, the power source 24 has a nominal line frequency of 60 Hz, but the invention can be easily adapted to work with any a.c. power supply, including inverters.

Line current into the motor 22 is monitored via a current transformer 26. In the preferred embodiment, the current transformer 26 is a split core, clip on transformer on one phase of the motor's power supply. Alternately, if the motor 22 is already connected to instrument transformers, such as those in a motor control center, the output signal from the instrument transformers can be used. Standard 60 Hz current transformers are all that is required since all the frequencies of interest are under 1000 Hz.

The motor's axial flux is monitored, for reasons explained below, with a flux sensor 28 located external to the motor 22, preferably near (i.,e., within one meter of) the motor and placed approximately symmetrically with respect to the axis of the motor's shaft 30.

For the purposes of this specification, all references to "flux" and "flux signals" refer to the motor's external axial flux, unless specifically otherwise stated.

The current and flux signals are buffered by separate filter/amplifiers 32 and 34. Each filter/amplifier contains an anti-aliasing filter which low pass filters the incoming signal. The purpose of filtering these signals is to minimize or eliminate signal components generated by the sampling process. Thus the filter's cutoff frequency $f_{cutoff}$ is selected as follows:

$$f_{cutoff} < 0.5 \times f_s$$

where $f_{cutoff}$ = filter cutoff frequency
$f_s$ = sampling frequency

Another limitation on the cutoff frequency is that the cutoff frequency must be higher than the highest spectral point to be used in the following analysis. In the preferred embodiment, for a motor running from a 60 Hz power supply, the filters 32 and 34 have a cutoff frequency around 800 Hz—so that the thirteenth harmonic of the line frequency, 780 Hz, is available for analysis.

The filter/amplifiers 32 and 34 also include an amplifier, such as the Tektronix AM502 amplifier, to amplify the incoming signal before it is low pass filtered.

Data Collection

The filtered and amplified signals are simultaneously sampled by sample and hold circuits 36 and 38, and are then sequentially converted into digital values by an ADC (analog to digital converter) 40. The current and flux signals are converted in alternating time slots so that a single ADC can be used. In any case, regardless of whether one or two ADCs are used, it is important that the current and flux data represent the motor's state at substantially identical times.

In the preferred embodiment, the ADC 40 and its support circuitry are included in a data collection device 42 made by Data Translation, Inc. of Marlborough, Mass., called the A/D Module DT2752. The data collection device 42 has an ADC controller 44 which is programmed by the system's computer 50 to perform a particular data collection sequence. The sequence used in the preferred embodiment is that the current and flux samples are serially converted by sequentially routing the two samples through a multiplexer 46 to the ADC 40, and storing the converted values in a buffer 48. The current and flux sample values are then transferred by DMA (direct memory access) into the memory 52 of the computer 50.

The data collection sequence, as described above, repeats at the specified frequency until enough data has been collected to permit an accurate analysis using commercially available FFT (Fast Fourier Transform) software. For example, data may be collected at rate of 2000 samples per second for about thirty-two seconds—resulting in the storage of approximately 64,000 time point samples for each signal.

In the initial tests performed by the inventors, a twelve bit analog to digital converter (ADC) was used. However, in future embodiments, an ADC 40 with greater resolution (such as sixteen bits) may be used to improve the amplitude resolution of the system.

The process of analyzing the collected data is described below. It should be noted, however, that computer 50 includes software 54, including both data analysis software and control software, so that, upon start up of the system 20 (after the system 20 has been coupled to a motor 22), the detection of rotor faults in an induction motor does not require human intervention. In other words, the present invention is designed for autonomous operation. Thus, the system 20 does not require its operator to be knowledgeable about its operation, nor to perform any functions which would require knowledge of data analysis, or even induction motors.

Background Information on Induction Motors

For those not skilled in the art of induction motor design, several items of basic information regarding induction motors are noted. The main components of an induction motor are a cylindrically shaped rotor and a surrounding stator. The space between the rotor and the stator is called the airgap, and the magnetic fields inside the airgap are often called the airgap flux.

The rotor is coupled to the motor's shaft, which is the component used to drive a load. The rotor's main components are a multiplicity (often thirty or more) of rotor bars which are held in place (along the outside circumference of the rotor), generally parallel to the axis of the motor's shaft, by two end rings and rotor slot overhangs.

The stator is wired to an a.c. power supply so that it generates a rotating magnetic field in the airgap, which causes the rotor to turn. Unlike some other types of motors, the speed of the motor—i.e., the rate at which the rotor turns—depends on the size of the load being driven by the motor. This rate is equal to the nominal motor speed (i.e., the rate at which the stator field rotates) minus a factor called the slip frequency, which is typically a very small fraction of the nominal motor speed. Thus the exact rate at which the rotor turns is not known unless it is measured.

The stator's magnetic field induces current in the rotor bars. As the rotor spins, the current in the rotor bars generates magnetic fields. Even though the primary location of the stator's and the rotor's magnetic fields (generally called flux) is in the airgap, components of the motor's flux can be detected external to the motor 22.

The flux associated with open and high resistance rotor bars will have a different pattern than the flux associated with normal rotor bars because the current flow through the broken rotor bar will be blocked, creating an imbalance between the stator's rotating field and rotor's field at the defective rotor bar or bars.

Similarly, the current flow into the motor will be affected by the presence of one or more broken rotor bars, or even a single high resistance (e.g., cracked) rotor bar. Thus, both the motor's line current and the rotor's flux will be affected by rotor faults.

It should be noted that current also flows through the rotor's end rings and that a cracked end ring will affect both the motor's line current and the axial flux.

Flux Sensor

In order to have a fully automated, autonomous rotor fault detection system, it is necessary to be able to automatically determine the slip frequency "$sf_o$" of the rotor very precisely. The slip frequency can be determined in at least two distinct ways. One way is to use a speed sensor to determine the motor's speed, and then subtract the measured motor speed from the nominal motor speed.

The exact speed of the motor can be calculated as follows:

motor speed = R × (line frequency − slip frequency)

where

R = 1/#pole-pairs in the motor when the motor speed is measured in revolutions per second. R is the ratio, determined by the number of pole-pairs in the motor, of the line frequency of the motor's power supply to the nominal motor speed of the motor (i.e., the motor's rated speed with no load on the motor).

When the motor speed is measured in units of revolutions per minute (rpm), $$\text{motor speed} = \frac{60 \times (\text{line frequency} - \text{slip frequency})}{\text{\#pole-pairs in the motor}}$$

Thus the slip frequency can be calculated as:

slip frequency = motor speed/R − line frequency

The "per unit slip" of the motor, commonly designated as "$s$", is defined by the formula:

$s$ = slip frequency/$f_o$ where $f_o$ = line frequency motor speed = $Rf_o(1-s)$ However, speed sensors of sufficient quality to provide an accurate slip frequency measurement are very expensive, and installing such a sensor on the motor's shaft 30 would require a shutdown of the motor. Since motor shutdown is to be avoided if at all possible, and the high cost of speed sensors is also problematical, the slip frequency is determined in the preferred embodiment using a flux sensor 28 which is external to the motor 22.

Referring to FIG. 1, the flux sensor 28 used in the preferred embodiment to determine the exact slip frequency of the motor 22 is a simple circular bobbin winding of several hundred turns. This coil 28 picks up a strong signal at the motor's slip frequency from the rotor end ring. The slip frequency signal has been found by the inventors to be strong for a wide variety of coil designs, placements and at various load levels.

The flux detection coil 28 is hung in any convenient manner outside the motor, preferably symmetrically to the axis of the rotor (which is generally the same as the axis of the shaft 30) and near the motor (preferably within one meter of the motor's casing), although the placement of the coil is not very critical.

The flux signal from the external flux sensor 28 contains signal components which can be used not only to determine the slip frequency of the motor, but also to detect end ring breaks and to support deductions made from analysis of the current signal.

Theory of Operation

When there are rotor faults (e.g., broken bars, a broken end ring, rotor ovality, misalignment, etc.), signals should appear in the airgap flux at certain frequencies:

$$f_k = f_o[k/p(1-s) \pm s] \quad \text{(Eq. 1)}$$

where $f_o$ = fundamental line frequency (usually 60 Hz)
$k$ = harmonic index ($k$ = 1, 2, 3, ...)
$p$ = number of pole-pairs in the motor
$s$ = per unit slip of the motor All of these frequency components, $f_k$, should be present in the airgap flux. Due to the structure of the windings in induction motors, only those frequencies where $k/p$ = 1, 5, 7, 11, 13, ... (i.e., where $k/p$ = an odd number, excluding multiples of 3) will, in theory, appear in the motor's current signal.

In other words, the presence of rotor faults will predictably affect the magnitude of certain frequency components of the line current signal. Manufacturing and other asymmetries in the motor may cause other frequency components to appear. However, the inventors have found that the magnitudes of the frequency components corresponding to $k/p$ = 1, 5, 7, 11 and 13 are the most reliable indicators of rotor faults.

Thus, for the purposes of this analysis, Equation 1 can be rewritten as $$f_n = f_o[n(1-s) \pm s] \quad \text{(Eq. 2)}$$

where $n$ = 1, 5, 7, 11 and 13.

These frequencies, $f_n$, are herein called the rotor fault harmonics. It should be noted that the rotor fault harmonics come in pairs of sideband frequencies, $\pm sf_o$, surrounding each harmonic of the frequency $f_o(1-s)$.

For convenience, each pair of rotor fault harmonics is labelled LSBn and USBn, where LSB means lower side band, USB means upper side band, and "n" is equal to the harmonic index value:

$$\text{LSBn} = nf_o(1-s) - sf_o \quad \text{(Eq. 3a)}$$

$$\text{USBn} = nf_o(1-s) + sf_o \quad \text{(Eq. 3b)}$$

Note that USB1 is equal to $f_o$ (i.e., the line current fundamental). Since the line current fundamental is dominated by the motor's power supply, USB1 is not usable as a rotor fault detection signal. Table 1 lists the rotor fault harmonics used in the preferred embodiment for fault analysis.

It should be noted that since the per unit slip may be as little as 0.0032, a high resolution spectrum analysis is required to accurately resolve the amplitude of each side band component defined by Equation 2 above.

TABLE 1

| ROTOR FAULT HARMONICS | |
|---|---|
| Name | Frequency |
| LSB1 | $f_o (1-2s)$ |
| USB5 | $f_o (5-4s)$ |
| LSB5 | $f_o (5-6s)$ |
| USB7 | $f_o (7-6s)$ |

TABLE 1-continued

ROTOR FAULT HARMONICS

| Name | Frequency |
| --- | --- |
| LSB7 | $f_o(7-8s)$ |
| USB11 | $f_o(11-10s)$ |
| LSB11 | $f_o(11-12s)$ |
| USB13 | $f_o(13-12s)$ |
| LSB13 | $f_o(13-14s)$ |

METHOD OF FAULT DETECTION

Figure 2:
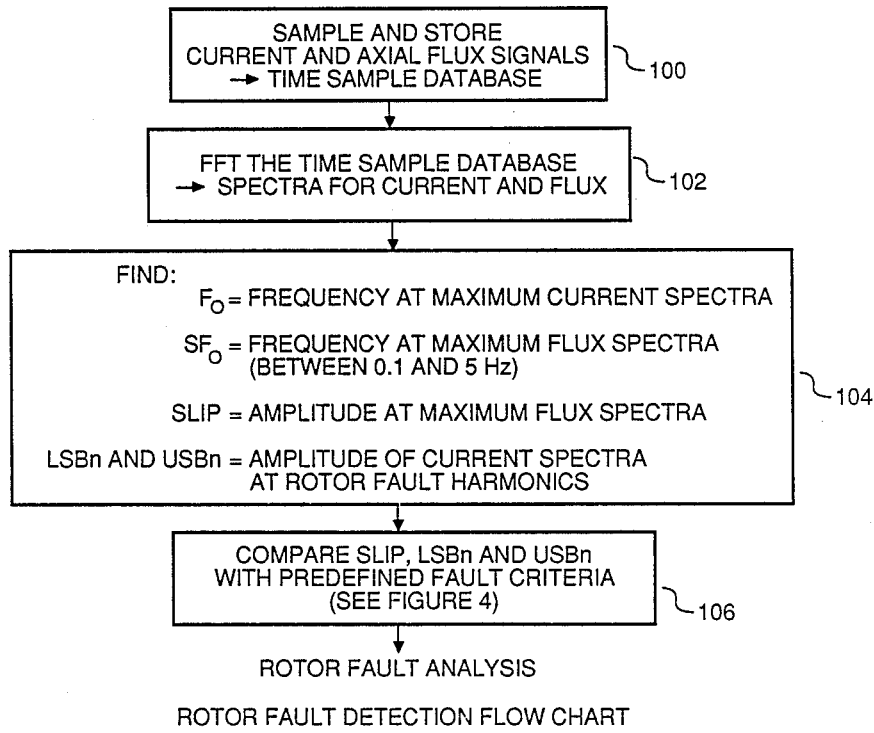
FIG. 2 is a flow chart of a method of detecting rotor faults in accordance with the present invention.

Referring to FIG. 2, the basic steps of the rotor fault detection method are data collection (box 100), transformation of the collected data into spectra (102), using the spectra to find the line frequency $f_o$ and slip frequency $sf_o$, and then using these frequency values to determine the amplitudes of the slip signal and the rotor fault harmonics (104). Finally, the amplitudes of the slip signals and the rotor fault harmonics are compared with predefined criteria to determine if there is a rotor fault, and to identify the nature of the fault (106).

As will be described in more detail below, the comparison step (106) compares the collected data with a previously collected motor profile, if one is available, and otherwise compares the collected data with a predefined set of criteria which represents a "standard" induction motor profile.

Digital Signal Collection

The primary goals of the inventors with regard to data collection were autonomous operation, and sufficiently high measurement and frequency resolution to allow reliable fault detection—sensitive enough to detect a single broken rotor bar, and also to differentiate between asymmetries and rotor breaks. High measurement resolution (i.e., amplitude resolution) is required to detect the rotor fault harmonic signals in the presence of the large fundamental frequency (i.e., 60 Hz power line) components. A high degree of precision is also required in frequency resolution to distinguish the sideband signals, and to automatically determine the slip and line frequencies. The latter step is essential to implementing an automatic spectral line selector.

High resolution Fourier transforms are usually performed by obtaining a set of fixed width frequency windows defined by hardware filters. Each bandpassed signal is heterodyned down to a base band equivalent in width to the window, and this restricted band is then converted into spectra by a relatively small Fast Fourier transform. The frequency axis of the resulting spectra is relabelled to reflect the band from which it came. This approach is not suitable for the present invention because the width of the required windows varies with the load on the system and will also vary from motor to motor. In addition, the time required to switch and run individual windows will often be longer than the time the motor's operating condition can be considered constant.

In the preferred embodiment, high resolution Fourier transforms of the current and flux signals are obtained by storing time data samples, and then performing a wide band (e.g., 0 Hz to 800 Hz), high resolution (e.g., 0.03 Hz bin size) Fourier transform. As will be understood by those skilled in the art, this method requires (1) the collection of a sufficient quantity of data to generate accurate spectra using standard FFT software, and (2) allowance for a considerably longer computation time than would be required for a narrow band FFT computation. Commonly available personal computers, such as the IBM PC/AT computer used in the preferred embodiment, are suitable for implementing the present invention. Typically, the time data samples occupy about 256k bytes (i.e., 256 kilobytes) of memory (2 bytes/sample*64 k samples/signal*2 signals). The data is initially stored in the computer's RAM (random access memory) during data collection, and is then copied onto a disk, such as a standard floppy or hard disk, before the data is Fourier transformed into spectra. Execution time is not particularly critical, and thus a personal computer may be used. In the preferred embodiment, data collection takes approximately 30 to 35 seconds, the FFT step takes approximately 4 minutes, and the fault analysis step takes a fraction of a second.

Note that newly available hardware, such as the TMS3020 made by Texas Instruments and specialized FFT chips from other manufacturers, reduce the total time for performing an FFT on the above described data to a few seconds.

The sample rate used is fixed in accordance with the highest frequency component to be used in the rotor fault analysis—i.e., it is not dependent on the motor's speed. Generally, the sample rate will be at least twenty percent (20%) higher than the Nyquist rate for the highest rotor fault harmonic:

$$\begin{aligned} \text{sample rate} &\geq 1.2 \times 2 \times (\text{highest rotor fault harmonic}) \\ &\geq 2.4 \times 13 f_o \\ &\geq 1872 \text{ Hz (where } f_o = 60 \text{ Hz)} \end{aligned}$$

In the preferred embodiment, the sample rate was set at 1953 Hz—which is slightly more than twenty-five percent higher than the Nyquist rate. Using round numbers, both the current signal and the axial flux signal are sampled at a rate of approximately 2000 times per second (i.e., a total of approximately 4000 samples are taken per second). The current and axial flux signals are sampled simultaneously in the preferred embodiment to guarantee simultaneity of the data. In other embodiments, equivalent simultaneity of the data could be provided by sampling the two signals in alternating (i.e., interleaved) time slots.

A rate of 4000 samples per second is well within the rate that can be handled by ordinary analog to digital converters and desk top personal computers.

Digital Signal Processing

At this point it is assumed that we have collected approximately thirty-two seconds of data—and thus that we have stored approximately 64,000 time data samples of the current and flux signals from an induction motor.

In order to have autonomous operation, the system must be able to compute the frequency of the rotor fault harmonics (i.e., the frequency components denoted by Eq. 2) very accurately. This, in turn, means that the measurement of the slip and line frequencies must be even more precise. To provide sufficient frequency resolution in the preferred embodiment, the fast Fourier transform bin size (FFT bin) was set at 0.03 Hz. In other words, the minimum resolvable frequency interval was selected to be 0.03 Hz.

The first step is to determine the line frequency by analyzing the current signal's spectrum. Thus the current signal is transformed by FFT into spectra. From the current spectra the line frequency $f_o$ is deduced to within 0.01 Hz by means of an interpolation routine.

Figure 3:
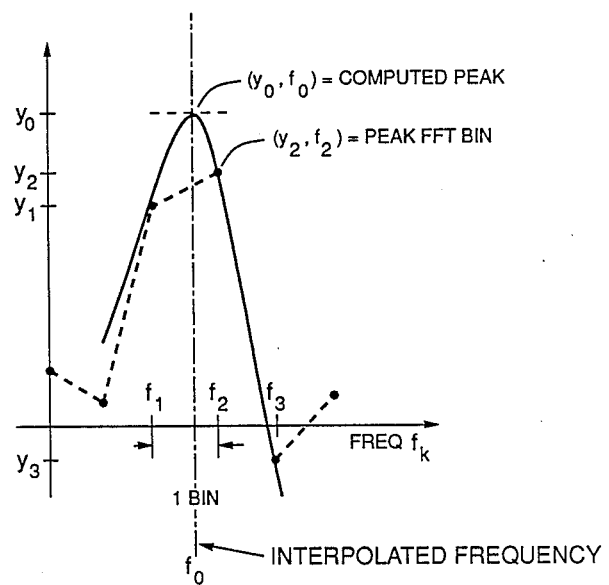
FIG. 3 depicts a method of calculating an approximate peak spectral frequency using quadratic interpolation.

In the preferred embodiment, the line frequency is computed using a quadratic interpolation method which is depicted in FIG. 3. The method works as follows.

First the maximum FFT bin of the current spectrum is selected and labelled ($Y_2$, $f_2$), where Y is the amplitude, and f is the frequency of the selected FFT bin. To speed this selection, the user specifies the expected line frequency, and the system searches for the maximum spectral amplitude in a predefined window (typically ±5 Hz from the expected value).

The interpolation routine then fits a parabola onto three points: the maximum FFT bin and the two points ($Y_1$, $f_1$) and ($Y_3$, $f_3$) closest to the the maximum ($Y_2$, $f_2$). The peak of this parabola is defined as the best estimate of the true peak (i.e., line) frequency $f_o$.

The interpolation formula used to calculate the best estimate of the line frequency $f_o$ is:

$$f_0 = f_2 - (f_2 - f_1)\left(1 - 0.5 * \frac{Y_3 - 4Y_2 + 3Y_1}{Y_3 - 2Y_2 + Y_1}\right)$$

Similarly, the slip frequency is computed by performing an FFT on the axial flux data, and then finding the maximum FFT bin of the resulting flux spectra in a predefined frequency range, typically between 0.1 Hz and 1.5 Hz. Then the best estimate of the slip frequency $sf_o$ is computed using the interpolation technique described above.

As will be discussed in more detail below, the inventors have found that the amplitude of the flux signal at the slip frequency $sf_o$ is highly indicative of the presence or absence of a broken end ring in the rotor. In the preferred embodiment, the axial flux amplitude at frequency $sf_o$ is labelled SLIP, and is set equal to $Y_2$ in FIG. 3, which is the amplitude of the axial flux signal in the maximum FFT flux bin. In alternate embodiments, the interpolated value $Y_o$ could be used as the axial flux (SLIP) amplitude.

The measured line frequency $f_o$ and slip frequency $sf_o$ are used to predict the frequency of the rotor fault harmonics using Equation 2. Note that for each harmonic index value there are two rotor fault harmonics. The amplitude of each rotor fault harmonic is computed as follows. First, the predicted frequency location of each rotor fault harmonic is calculated using Equation 2, described above. Then, a narrow search (e.g., two or three bins, ±0.06 or ±0.09 Hz) is made around the each predicted rotor fault harmonic to establish an exact frequency and maximum amplitude. In other words, a search is made for the maximum FFT bin within a certain range of the predicted frequency location, and the amplitude of the rotor fault harmonic is then set to the amplitude of the maximum FFT bin found by the search.

The amplitudes of the rotor fault harmonics identified in Table 1 values are typically expressed in decibel units as follows:

$$V_{x,dB} = 20 \log_{10}(M_x/M_{fo})$$

where x is an index for identifying different rotor fault harmonics, V is the value of harmonic x in decibels, $M_x$ is the measured amplitude value of harmonic x, and $M_{fo}$ is the measured amplitude value at the fundamental line frequency.

Fault Analysis

At this point it is assumed that we have computed, for a selected motor, the amplitudes of the current spectra at the rotor fault harmonics (i.e., frequencies) listed in Table 1, and the amplitude of the flux signal at the slip frequency. These values are preferably denoted in decibel units.

The particular fault analysis method applied depends on whether a "motor personality" is available from measuring the rotor fault harmonics and slip frequency flux at an earlier time, such as when the motor was first assembled or rewound. In other words, if data representing the motor when it has no known faults is available, the fault analysis can make use of that data. In the preferred embodiment, the motor personality is a file in the format shown in Table 2.

If a Motor Personality File is not available, then the fault analysis uses a "standard" motor personality file, which represents the best available mean values for the parameters listed in Table 2 for motors similar to the one being tested.

The inventors have determined that motors with end ring breaks have an unusually large axial flux signal amplitude at the slip frequency (herein called the SLIP value). Typically, this value for a normal rotor is between −28 dB and −36 dB (i.e., with respect to the axial flux at $f_o$). Even rotors with broken rotor bars, but an unbroken end ring, have SLIP values below −25 dB. However, rotors with a broken end ring typically have SLIP values around −10 dB. Thus, if ΔSLIP is greater than or equal to 10 dB, the motor probably A has a broken end ring. The fault criteria A is therefore set equal to a value between 10 dB and 15 dB.

TABLE 2

| MOTOR PERSONALITY FILE - CURRENT SPECTRA VALUES | |
|---|---|
| Parameter | Description |
| SLIP | Axial flux at slip frequency $sf_o$ |
| LSB1 | Current at $f_o$ (1−2s) |
| USB5 | Current at $f_o$ (5−4s) |
| LSB5 | Current at $f_o$ (5−6s) |
| USB7 | Current at $f_o$ (7−6s) |
| LSB7 | Current at $f_o$ (7−8s) |
| USB11 | Current at $f_o$ (11−10s) |
| LSB11 | Current at $f_o$ (11−12s) |
| USB13 | Current at $f_o$ (13−12s) |
| LSB13 | Current at $f_o$ (13−14s) |

Similarly, the inventors have measured the rotor fault harmonics LSBn and USBn listed in Table 1 for normal rotors and for rotors with one partially broken bar, one, two, and three fully broken bars, and for rotors with a broken end ring. The result of this study is that the inventor's have determined that:

The SLIP value is the best detector of end ring breaks.

LSB1 is the best general detector of broken rotor bars and that if ΔLSB1 is less than about 3 dB then there is probably no rotor fault.

All of the rotor fault harmonics listed in Table 1 generally show an increase of at least 4 dB when one rotor bar is broken, and at least 8 dB when two or more rotor bars are fully broken; however, some configurations of broken rotor bars will result in one or more rotor faults harmonics which do not follow this pattern.

Rotor asymmetries tend to result in a value of ΔLSB1 of 4 to 6 dB, and values of less than 3 dB for the other ΔLSBn and ΔUSBn listed in Table 1.

Figure 4:
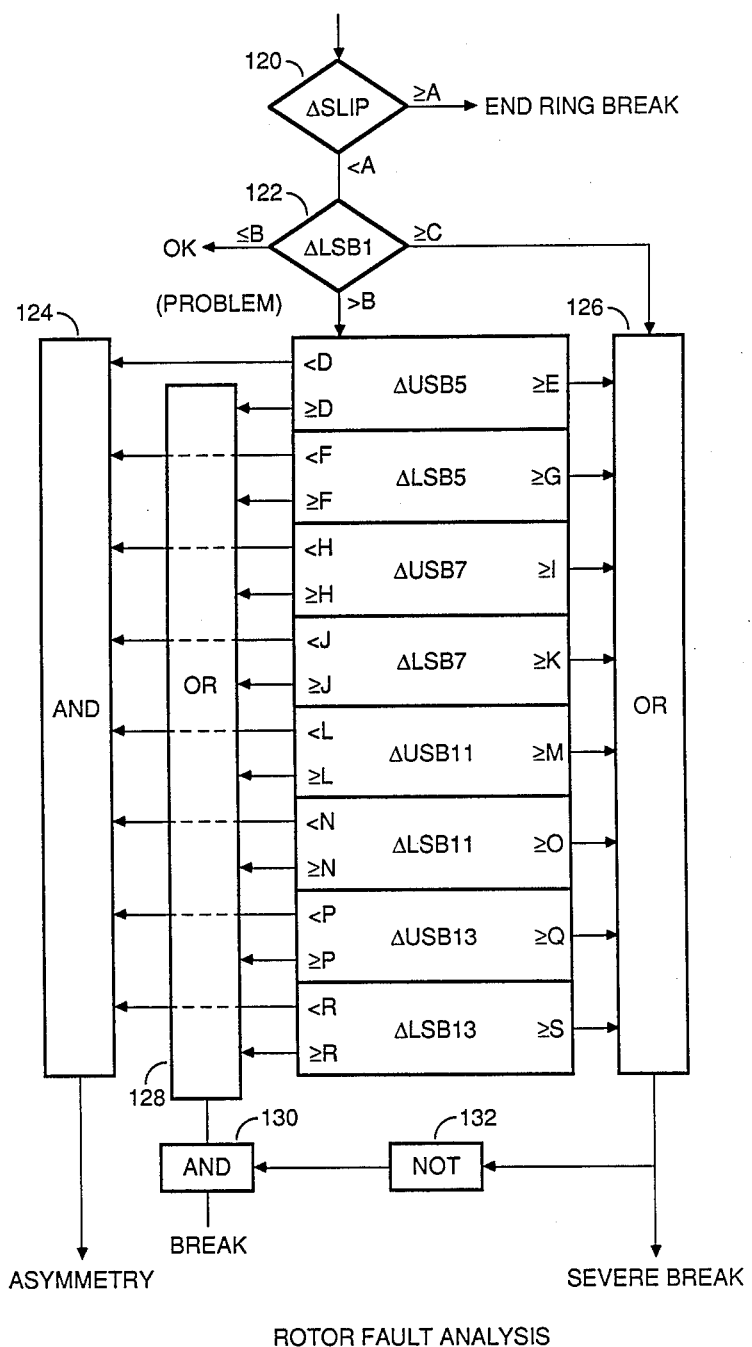
FIG. 4 depicts a method of analyzing motor current spectra to find rotor faults.

Referring to FIG. 4, the preferred fault analysis method compares a set of motor fault parameters (which are equal to the difference between the measured values and the values in the Motor Personality File) with a set of predefined criteria. Table 3 lists the motor fault parameters, each of which uses the same symbol as listed in Table 2, preceded by a delta Δ.

TABLE 3
MOTOR FAULT PARAMETERS

| Parameter | Description |
|---|---|
| ΔSLIP | SLIP (measured) - SLIP (personality) |
| ΔLSB1 | LSB1 (measured) - LSB1 (personality) |
| ΔUSB5 | USB5 (measured) - USB5 (personality) |
| ΔLSB5 | LSB5 (measured) - LSB5 (personality) |
| ΔUSB7 | USB7 (measured) - USB7 (personality) |
| ΔLSB7 | LSB7 (measured) - LSB7 (personality) |
| ΔUSB11 | USB11 (measured) - USB11 (personality) |
| ΔLSB11 | LSB11 (measured) - LSB11 (personality) |
| ΔUSB13 | USB13 (measured) - USB13 (personality) |
| ΔLSB13 | LSB13 (measured) - LSB13 (personality) |

As shown in FIG. 4, the fault criteria are a set of values labelled A through Q, which act as threshold values for determining the presence of a fault. Table 4 shows the set of fault threshold values A through Q used in one preferred embodiment of the invention.

The initial step in the preferred method is to check for an end ring break (box 120). Then the size of ΔLSB1 is checked (box 122) to determine if there is a rotor fault to be analyzed. If there is no discernible problem, the analysis is done. Otherwise, three further checks are performed: (1) if all the motor fault parameters (excluding ΔLSB1) are less than a corresponding first value, the problem is determined to probably a rotor asymmetry (box 124), (2) if any of the motor fault parameters (including ΔLSB1) exceed a second corresponding value, the problem is determined to probably be a severe break (box 126), and (3) if the problem is neither an asymmetry nor a severe break, it is determined to be break, which is likely to be a single bar break or a partial break (boxes 128, 130 and 132).

The Appendix at the end of this specification shows a pseudocode rendition of the flow chart shown in FIG. 4.

Table 5 shows an exemplary "standard" motor personality file used by the inventors on 50 horsepower motors when no motor personality file is available for the motor being tested.

Note that values below −80 dB may include errors caused by computational resolution limits—which would be eliminated by using a higher resolution analog to digital converter.

TABLE 4
MOTOR FAULT THRESHOLD CRITERIA - DERIVED FROM LAB TESTS

| Threshold Parameter | Related Motor Parameter | Value (dB) |
|---|---|---|
| A | ΔSLIP | 12 |
| B | ΔLSB1 | 3 |
| C | ΔLSB1 | 10 |
| D | ΔUSB5 | 4 |
| E | ΔUSB5 | 12 |
| F | ΔLSB5 | 4 |
| G | ΔLSB5 | 12 |
| H | ΔUSB7 | 4 |
| I | ΔUSB7 | 12 |
| J | ΔLSB7 | 4 |
| K | ΔLSB7 | 12 |
| L | ΔUSB11 | 4 |
| M | ΔUSB11 | 12 |
| N | ΔLSB11 | 4 |
| O | ΔLSB11 | 12 |
| P | ΔUSB13 | 4 |
| Q | ΔUSB13 | 9 |

TABLE 5
EXEMPLARY "STANDARD" MOTOR PERSONALITY FILE

| Parameter | Value (dB) |
|---|---|
| ΔSLIP | −30 |
| ΔLSB1 | −60 |
| ΔLSB5 | −97 |
| ΔUSB5 | −90 |
| ΔLSB7 | −92 |
| ΔUSB7 | −90 |
| ΔLSB11 | −96 |
| ΔUSB11 | −101 |
| ΔLSB13 | −90 |
| ΔUSB13 | −99 |

ALTERNATE EMBODIMENTS

Background Noise Compensation

In an alternated embodiment of the method described above, each measured parameter is reduced by a background noise factor. The background noise for each parameter is calculated by computing the average signal level in a predefined band around the parameter. The FFT bin corresponding to the parameter is excluded from the computation of the background noise. Also, the size of the band used for computing the background noise is usually narrow, typically on the order ±1.0 Hz, because there are often other spectral components in the near vicinity to those selected for the rotor fault analysis.

While subtracting "noise" from the rotor fault harmonics would seem to provide a more reliable profile of a motor's condition, the inventors have actually found that these "noise" factors are much more inconsistent than the basic measurement data—i.e., than the amplitudes of the rotor fault harmonics, without any noise compensation. The inventors believe that the variability of the noise factors is partially caused by inaccuracies in the process of digitizing the current and flux signals, and that this variability will be reduced by using an ADC with greater resolution combined with automatic gain control and dynamic range setting.

Using Flux Spectra at Rotor Fault Harmonics

The inventors have investigated the use of axial flux spectra at the rotor fault harmonic frequencies listed in Table 1 as detectors of rotor faults. In general, it would be preferred to have a rotor fault detector that used only axial flux spectra for the fault analysis—because that would eliminate the need for a line current sensor, and would generally simplify the system.

The inventors found that the flux spectra provided almost equally good detection of rotor faults as did the current spectra, provided that "good" motor base line data (i.e., motor personality data from when the motor was in good working condition) was available. In general, the method of the invention works very well using the flux spectra.

As will be clear to anyone who considers the problem, in a system using only the axial flux spectra for its analysis, the motor fault parameters, the motor personality data (see Table 2) and the other corresponding parameters will all be related to axial flux measurements. It should also be noted that in embodiments of the invention using solely flux signals for rotor fault detection, the line frequency $f_o$ is determined by finding the maximum FFT bin—using basically the same method as described above when using the current spectra. Similarly, the inventors have found that the use of background noise compensation with the flux spectra generally has the same benefits and problems as discussed above with respect to the current spectra.

Other Alternate Embodiments

In another alternate embodiment of the invention, the flux spectra analysis is used in addition to the current spectra analysis, and the results of both analyses are reported. Thus the flux spectra analysis is used to confirm the results of the analysis of the current spectra.

In another variation, a weighted summation of the motor fault parameters can be compared with specified limits to differentiate between asymmetries, breaks and severe breaks.

It should also be noted that it is not necessary to use all of the rotor fault harmonics listed in the above tables to perform a rotor fault analysis. The rotor fault harmonics listed above are those found by the inventors to be the most reliable detectors of faults. In most applications, a set of three of these rotor faults harmonics (e.g., LSB1, USB5 and USB7; or LSB1, USB5 and USB11) would be sufficient to provide reliable rotor fault detection.

In yet another variation, an air gap flux sensor which is internal to the motor could be used instead of the external axial flux sensor used in the preferred embodiment. This variation would be used primarily in new motors, because a flux sensor coil can be wound around a stator tooth on a new motor while the motor is being assembled—thereby avoiding the need to disassemble the motor to install the flux sensor. Such an air gap flux sensor is used in the system described in another patent application, entitled Rotor Fault and Location Detector for Induction Motors, Ser. No. 50,992, filed May 15, 1987, assigned to the same assignee (Electric Power Research Institute) as the present invention, and which is hereby incorporated by reference.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX

Pseudocode for Rotor Fault Analysis

If $\Delta SLIP \geq A$
   Report "End Ring Break"
   Return
   End

If $\Delta LSB1 \leq B$
   Report "No Rotor Fault Found"
   Return
   End

If ($\Delta LSB1 \geq C$ .OR.
   $\Delta USB5 \geq E$ .OR. $\Delta LSB5 \geq G$ .OR.
   $\Delta USB7 \geq I$ .OR. $\Delta LSB7 \geq K$ .OR.
   $\Delta USB11 \geq M$ .OR. $\Delta LSB11 \geq O$ .OR.
   $\Delta USB13 \geq Q$ .OR. $\Delta LSB13 \geq S$)
   Report "Rotor Fault Found: Severe Break"
   Return
   End If ($\Delta USB5 \geq D$ .OR. $\Delta LSB5 \geq F$ .OR.
   $\Delta USB7 \geq H$ .0R. $\Delta LSB7 \geq J$ .OR.
   $\Delta USB11 \geq L$ .OR. $\Delta LSB11 \geq N$ .OR.
   $\Delta USB13 \geq P$ .OR. $\Delta LSB13 \geq R$)
   Report "Rotor Fault Found: Break"
   Return
   End Report "Rotor Fault Found: Apparent Rotor Asymmetry"
Return

What is claimed is:

1. A method of detecting rotor faults in an induction motor, the motor including a rotor with a multiplicity of rotor bars, and a stator which draws current from a power supply, the method comprising the steps of:
   generator a flux signal corresponding to the magnetic flux at a predefined flux detection point external to the motor;
   generating a current signal proportional to the current drawn by said motor;
   storing a time series of flux samples and a time series of current samples, representing the values of said flux and current signals over a period of time;
   transforming said stored flux samples into a set of flux spectra and said stored current samples into a set of current spectra;
   determining the line frequency of said power supply by finding the maximum of the current spectra;
   determining the slip frequency of said motor by finding the maximum of the flux spectra in a predefined spectral range;
   comparing the amplitude of said current spectra at a set of rotor fault harmonic frequencies with specified fault threshold criteria, each said rotor fault harmonic frequency being a predefined function of said line frequency and said slip frequency; and
   denoting the presence of a rotor fault if the amplitude of a predefined set of said current spectra exceed the corresponding fault threshold criteria.

2. The method of claim 1, wherein said rotor fault harmonic frequencies include at least three items selected from the set consisting of $f_o(1-2s)$, $f_o(5-4s)$, $f_o(5-6s)$, $f_o(7-6s)$, $f_o(7-8s)$, $f_o(11-10s)$, $f_o(11-12s)$, and $f_o(13-12s)$, where $f_o$ is said line frequency, and s is said slip frequency divided by said line frequency.

3. The method of claim 1, wherein all of said steps are automatically performed, upon start up, so that the detection of rotor faults in an induction motor by said method does not require human intervention.

4. The method of claim 1, wherein said comparing and denoting steps include the steps of:

denoting said rotor as not having a rotor fault if the amplitude (LSB1) of the rotor fault harmonic of the current spectra at a frequency of $f_o(1-2s)$ is less than a first threshold value, where $f_o$ is said line frequency, and s is said slip frequency divided by said line frequency; and denoting said rotor as having at least one broken rotor bar if (a) said amplitude LSB1 is not less than said first threshold value, and (b) the amplitude of at least one of said rotor fault harmonics of the current spectra exceeds a corresponding threshold value.

5. The method of claim 1, wherein said comparing and denoting steps include the steps of:

denoting said rotor has having a broken end ring if the amplitude (SLIP) of said flux spectra at a frequency equal to said slip frequency exceeds a corresponding threshold value.

6. Apparatus which detects rotor faults in an induction motor, the motor including a rotor with a multiplicity of rotor bars, and a stator which draws current from a power supply, comprising:

a flux sensor which generates a flux signal corresponding to the magnetic flux at a predetermined flux detection point external to the motor;

a current sensor which generates a current signal proportional to the current drawn by said motor;

sampling means for storing a time series of flux samples and a time series of current samples, representing the values of said flux and current signals over a period of time;

FFT means for transforming said stored flux samples into a set of flux spectra and said stored current samples into a set of current spectra;

first software means for determining the line frequency of said power supply by finding the maximum of said current spectra;

second software means for determining the slip frequency of said motor by finding the maximum of said flux spectra in a predefined spectral range;

fault analysis means for comparing the amplitude of said current spectra, at a set of rotor fault harmonic frequencies with specified fault threshold criteria, each said rotor fault harmonic frequency being a predefined function of said line frequency and said chip frequency; and output means for denoting the presence of a rotor fault if the amplitude of a predefined set of said current spectra exceed the corresponding fault threshold criteria.

7. The apparatus of claim 6, wherein said rotor fault harmonic frequencies include at least three items selected from the set consisting of $f_o(1-2s)$, $f_o(5-4s)$, $f_o(5-6s)$, $f_o(7-6s)$, $f_o(7-8s)$, $f_o(11-10s)$, $f_o(11-12s)$, and $f_o(13-12s)$;

where $f_o$ is said line frequency, and s is said slip frequency divided by said line frequency.

8. The apparatus of claim 6, including computer means having control software for autonomous operation of said system, said computer means and control software including means for autonomously, upon start up, coordinating the operation of said sampling means, said FFT means, said first and second software means, said fault analysis means, and said output means, so that said apparatus automatically performs all the steps necessary to detect rotor faults if an induction motor coupled to said apparatus by said flux and current sensors.

9. The apparatus of claim 6, wherein said fault analysis means and output means include means for performing the steps of:

denoting said rotor as not having a rotor fault if the amplitude (LSB1) of the rotor fault harmonic of the current spectra at a frequency of $f_o(1-2s)$ is less than a first threshold value;

where $f_o$ is said line frequency, and s is said slip frequency divided by said line frequency;

if said amplitude LSB1 is greater than said first threshold value, denoting said rotor as having at least one broken rotor bar if the amplitude of at least one of said rotor fault harmonics of the current spectra exceeds a corresponding threshold value.

10. The apparatus of claim 6, wherein said fault analysis means and output means include means for performing the steps of:

denoting said rotor as having a broken end ring if the amplitude (SLIP) of said flux spectra at a frequency equal to said slip frequency exceeds a corresponding threshold value.

11. A method of detecting rotor faults in an induction motor, the motor including a rotor with a multiplicity of rotor bars, and a stator which draws current from a power supply, the method comprising the steps of:

generating a flux signal corresponding to the magnetic flux at a predefined flux detection point external to the motor;

storing a time series of flux samples representing the values of said flux signal over a period of time;

transforming said stored flux samples into a set of flux spectra;

determining the line frequency of said power supply by finding the maximum of said flux spectra;

determining the slip frequency of said motor by finding the maximum of said flux spectra in a predefined spectral range;

comparing the amplitude of said flux spectra at a set of rotor fault harmonic frequencies with specified, fault threshold criteria, each said rotor fault harmonic frequency being a predefined function of said line frequency and said slip frequency; and denoting the presence of a rotor fault if the amplitude of a predefined set of said flux spectra exceed the corresponding fault threshold criteria.

12. The method of claim 11, wherein said rotor fault harmmonic frequencies are selected from the set of frequencies defined as $$f_n = f_o[n(1-s)\pm s]$$

where each distinct value of $f_n$ is a rotor fault harmonic frequency, $f_o$ is the line frequency of said power supply, s is the per unit slip of the motor, and n is any odd number, excluding multiples of 3.

13. The method of claim 11, wherein said rotor fault harmonic frequencies include at least three items selected from the set consisting of $f_o(1-2s)$, $f_o(5-4s)$, $f_o(5-6s)$, $f_o(7-6s)$, $f_o(7-8s)$, $f_o(11-10s)$, $f_o(11-12s)$, and $f_o(13-12s)$, where $f_o$ is said line frequency, and s is said slip frequency divided by said line frequency.

14. The method of claim 11, wherein said comparing and denoting steps include the step of classifying the severity of the fault found, if any, in accordance with a predefined set of comparison tests, each said comparison test comparing said flux spectra at a set of rotor fault harmonic frequencies with corresponding fault threshold criteria.

15. The method of claim 11, wherein said comparing and denoting steps include the steps of:
   denoting said rotor as not having a rotor fault if the amplitude (LSB1) of the rotor fault harmonic of the current spectra at a frequency of $f_o(1-2s)$ is less than a first threshold value, where $f_o$ is said line frequency, and s is said slip frequency divided by said line frequency; and
   denoting said rotor as having at least one broken rotor bar if (a) said amplitude LSB1 is not less than said first threshold value, and (b) the amplitude of at least one of said rotor fault harmonics of the flux spectra exceeds a corresponding threshold value.

16. The method of claim 11, wherein said comparing and denoting steps include the step of:
   denoting said rotor as having a broken end ring if the amplitude (SLIP) of said flux spectra at a frequency equal to said slip frequency exceeds a corresponding threshold value.

17. Apparatus which generates rotor faults in an induction motor, the motor including a rotor with a multiplicity of rotor bars, and a stator which draws current from a power supply, comprising:
   a flux sensor which generates a flux signal corresponding to the axial magnetic flux at a predefined flux detection point external to the motor;
   sampling means for storing a time series of flux samples representing the values of said flux signal over a period of time;
   FFT means for transforming said stored flux samples into a set of flux spectra;
   first software means for determining the line frequency of said power supply by finding the maximum of said flux spectra;
   second software means for determining the slip frequency of said motor by finding the maximum of said flux spectra in a predefined spectral range;
   fault analysis means for comparing the amplitude of said flux spectra, at a set of rotor fault harmonic frequencies with specified fault threshold criteria, each said rotor fault harmonic frequency being a predefined function of said line frequency and said slip frequency; and
   output means for denoting the presence of a rotor fault if the amplitude of a predefined set of said flux spectra exceed the corresponding fault threshold criteria.

18. The apparatus of claim 17, including computer means having control software for autonomous operation of said system, said computer means and control software including means for autonomously, upon start up, coordinating the operation of said sampling means, said FFT means, said first and second software means, said fault analysis means, and said output means, so that said apparatus automatically performs all the steps necessary to detect rotor faults if an induction motor coupled to said apparatus by said flux sensor.

19. The apparatus of claim 17, wherein said fault analysis means and output means include means for performing the steps of:
   denoting said rotor as not having a rotor fault if the amplitude (LSB1) of the rotor fault harmonic of the flux spectra at a frequency of $f_o(1-2s)$ is less than a first threshold value, where $f_o$ is said line frequency, and s is said slip frequency divided by said line frequency; and
   denoting said rotor as having at least one broken rotor bar if (a) said amplitude LSB1 is greater than said first threshold value, and (b) the amplitude of at least one of said rotor fault harmonics of the current spectra exceeds a corresponding threshold value.

20. The apparatus of claim 17, wherein said fault analysis means and output means include means for performing the steps of:
   denoting said rotor as having a broken end ring if the amplitude (SLIP) of said flux spectra at a frequency equal to said slip frequency exceeds a corresponding threshold value.

21. A method of detecting rotor faults in an induction motor, the motor including a rotor with a multiplicity of rotor bars, and a stator which draws current from a power supply, the method comprising the steps of:
   generating a flux signal corresponding to the magnetic flux at a predefined flux detection point external to the motor;
   generating a current signal proportional to the current drawn by said motor;
   storing a time series of flux samples and a time series of current samples, representing the values of said flux and current signals over a period of time;
   transforming said stored flux samples into a set of flux spectra and said stored current samples into a set of current spectra;
   determining the line frequency of said power supply by finding the maximum of said flux spectra;
   determining the slip frequency of said motor by finding the maximum of said flux spectra in a predefined spectral range;
   comparing the amplitude of said current spectra at a set of rotor fault harmonic frequencies with a first set of specified fault threshold criteria, each said rotor fault harmonic frequency being a predefined function of said line frequency and said slip frequency;
   comparing the amplitude of said flux spectra at a set of rotor fault harmonic frequencies with a second specified fault threshold criteria, each said rotor fault harmonic frequency being a predefined function of said line frequency and said slip frequency; and
   denoting the presence of a rotor fault if the amplitudes of a predefined set of said current spectra and said flux spectra, at specified rotor fault harmonic frequencies, exceed corresponding fault threshold criteria.

22. The method of claim 11, wherein said rotor fault harmonic frequencies are selected from the set of frequencies defined as $$f_n = f_o[n(1-s) \pm s]$$

where each distinct value of $f_n$ is a rotor fault harmonic frequency, $f_o$ is the line frequency of said power supply, s is the per unit slip of the motor, and n is any odd number, excluding multiples of 3.

* * * * *